US012453668B2

(12) United States Patent
Dole et al.

(10) Patent No.: US 12,453,668 B2
(45) Date of Patent: Oct. 28, 2025

(54) ROTATING ASSEMBLY FOR ELECTRICALLY COUPLING A LIFT UNIT TO A POWER SOURCE

(71) Applicant: LIKO RESEARCH & DEVELOPMENT AB, Luleå (SE)

(72) Inventors: Andrew Dole, Batesville, IN (US); Joseph Tari, Baldwinsville, NY (US); Samuel Svintozelsky, Batesville, IN (US)

(73) Assignee: LIKO RESEARCH & DEVELOPMENT AB, Luleå (SE)

( * ) Notice: Subject to any disclaimer, the term of this patent is extended or adjusted under 35 U.S.C. 154(b) by 330 days.

(21) Appl. No.: 18/167,236

(22) Filed: Feb. 10, 2023

(65) Prior Publication Data

US 2023/0190557 A1 Jun. 22, 2023

Related U.S. Application Data

(63) Continuation of application No. 17/329,533, filed on May 25, 2021, now Pat. No. 11,602,471.

(Continued)

(51) Int. Cl.

*H01R 39/00* (2006.01)
*A61G 7/10* (2006.01)
*H01R 39/08* (2006.01)

(52) U.S. Cl.

CPC ......... *A61G 7/1076* (2013.01); *A61G 7/1042* (2013.01); *A61G 7/1046* (2013.01);

(Continued)

(58) Field of Classification Search

CPC .. B66C 7/02; B66C 9/02; B66C 11/00; B66C 11/04; B66C 11/08; B66C 19/00;

(Continued)

(56) References Cited

U.S. PATENT DOCUMENTS 1,212,860 A * 1/1917 Wettengel .............. B22D 41/20 222/602
2,224,906 A * 12/1940 Fraula .................... B22D 41/12 212/319

(Continued)

FOREIGN PATENT DOCUMENTS

CN 105905800 A * 8/2016
CN 107215784 A * 9/2017

(Continued)

OTHER PUBLICATIONS

3EN620403 Rev 4 Servicmanual, Liko, Ultra Twist System, pp. 1-8, Hill-Rom, 2017.
UltraTwist_InstrG_EN, Liko, pp. 1-10, 2009.

*Primary Examiner* — Anna M Momper
*Assistant Examiner* — Henrix Soto
(74) *Attorney, Agent, or Firm* — Dinsmore & Shohl LLP

(57) ABSTRACT

An overhead lift apparatus includes a mounting structure and a rotatable assembly configured to attach a lift unit to the mounting structure. The rotatable assembly is rotatable with respect to the mounting structure about an axis of rotation. The apparatus also includes a rotatable electrical interface disposed in the rotatable assembly, the rotatable electrical interface comprises a static portion and a rotatable portion attached to the rotatable assembly such that the rotatable portion rotates in conjunction with the rotatable assembly. The apparatus also includes a first electrical connector extending from the static portion to a power source connector configured to be connected to an external power source for the lift unit. A second electrical connector extends from the rotatable portion such that the rotatable electrical interface is configured to provide power from the power source to an end of the second electrical connector via the first electrical connector.

18 Claims, 6 Drawing Sheets

Related U.S. Application Data

(60) Provisional application No. 63/031,142, filed on May 28, 2020.

(52) U.S. Cl.
CPC ........... *A61G 7/1049* (2013.01); *H01R 39/00* (2013.01); *H01R 39/08* (2013.01)

(58) Field of Classification Search
CPC . B66C 2700/0342; B66C 13/12; B66C 23/84; B66D 3/18; B60M 1/30; B60M 1/34; A61G 7/1076; A61G 7/1042; A61G 7/1046; A61G 7/1049; H01R 39/00; H01R 39/08
See application file for complete search history.

(56) References Cited

U.S. PATENT DOCUMENTS

| | | | | | |
|---|---|---|---|---|---|
| 2,766,625 | A * | 10/1956 | Swanson | H01R 39/643 439/26 |
| 3,467,263 | A * | 9/1969 | Yendrich, Jr. | B66C 19/002 212/346 |
| 3,874,514 | A * | 4/1975 | Wilson | B66C 17/10 212/290 |
| 3,887,080 | A * | 6/1975 | Wilson | B66C 11/02 212/274 |
| 4,158,414 | A * | 6/1979 | Wilson | B66C 17/06 212/346 |
| 6,536,056 | B1 | 3/2003 | Vrzalik et al. | |
| 8,978,905 | B2 | 3/2015 | Bergenstrale et al. | |
| 9,796,168 | B2 | 10/2017 | Bergenstrale et al. | |
| 9,889,055 | B2 | 2/2018 | Sabota | |
| 10,130,536 | B2 | 11/2018 | Roussy et al. | |
| 2004/0258513 | A1* | 12/2004 | Cooke | B66C 1/66 414/626 |
| 2009/0126112 | A1 | 5/2009 | Kuchenbecker et al. | |
| 2009/0263061 | A1 | 10/2009 | Takahashi | |
| 2017/0217333 | A1* | 8/2017 | Maier | B60M 1/06 |

FOREIGN PATENT DOCUMENTS

| | | | | |
|---|---|---|---|---|
| CN | 107954337 | A * | 4/2018 | |
| DE | 2410223 | A1 * | 2/1975 | |
| EP | 2799277 | A2 * | 11/2014 | A22B 7/004 |
| EP | 3453373 | A1 | 3/2019 | |
| EP | 3510987 | A1 | 7/2019 | |
| KR | 101429092 | B1 * | 9/2014 | |
| KR | 20150014187 | A * | 2/2015 | |
| WO | 2019091262 | A1 | 5/2019 | |

* cited by examiner

ROTATING ASSEMBLY FOR ELECTRICALLY COUPLING A LIFT UNIT TO A POWER SOURCE

CROSS-REFERENCE TO RELATED APPLICATIONS

This application is a continuation of U.S. patent application Ser. No. 17/329,533, filed on May 25, 2021, which claims the benefit of priority under 35 U.S.C. § 119 of U.S. Provisional Application Ser. No. 63/031,142 filed on May 28, 2020, the contents of which are incorporated herein by reference in their entirety.

BACKGROUND

Field

The present specification generally relates to subject lifting devices and, in particular, to rotatable lifting devices having an electrical connection between a rotating part and a non-rotating part.

Technical Background

Overhead lifting devices, such as patient lifts used in the health care industry, may generally comprise a lift unit with an actuator, such as an electric motor or similar actuator, coupled to a mechanical lifting arm or cable lift system, such as a lifting strap. Lifting apparatuses with single lift units may not provide adequate support for lifting certain subjects of over 300 kg. For such uses, certain lifting devices may incorporate more than one lift unit (e.g., two lift units). The two lift units may be powered simultaneously to lift heavy subjects. The lift units may both include actuators powered by batteries positioned in each lift unit.

The lifting device may be coupled to a rail system which facilitates positioning of the lifting devices with respect to the rail for patient needs. To charge the batteries of the lift units, the lifting device may need to be moved to a discrete charging location. Such a process for recharging may be inefficient in that it requires the lifting device to be removed from useful operation (e.g., lifting patients). Moreover, moving a lifting device including multiple lift units may be especially cumbersome to move to a charging station due to the lifting device's size, potentially requiring movement of furniture disposed proximate to the charging station.

Accordingly, a need exists for alternative mechanisms for continuously powering and/or charging a lifting device as the lift unit is traversed across a rail SUMMARY According to an embodiment of the present disclosure an overhead lift apparatus comprises a mounting structure and a rotatable assembly configured to attach a lift unit to the mounting structure. The rotatable assembly is rotatable with respect to the mounting structure about an axis of rotation. The apparatus also includes a rotatable electrical interface disposed in the rotatable assembly, wherein the rotatable electrical interface comprises a static portion and a rotatable portion attached to the rotatable assembly such that the rotatable portion rotates in conjunction with the rotatable assembly. The apparatus also includes a first electrical connector extending from the static portion to a power source connector. The power source connector is configured to be connected to an external power source for the lift unit. A second electrical connector extends from the rotatable portion such that the rotatable electrical interface is configured to provide power from the power source to an end of the second electrical connector via the first electrical connector.

According to another embodiment, an overhead lift apparatus comprises a first rail having a first carriage support channel formed in the first rail. The first rail includes a first electrical conductor disposed in the first carriage support channel. A first carriage is slidably disposed in the first carriage support channel, and a portion of the first carriage is conductively connected to the first electrical conductor. A first electrical connector extends from the portion of the first carriage to a power source connector. A carrier plate coupled to the first carriage and a turning plate is rotatably coupled to the carrier plate via hub having an axis of rotation. The hub comprises an axle extending through both the turning plate and the carrier plate. The axle comprises a first end extending beneath the turning plate, a second end extending above the carrier plate, and an opening extending from the first end to the second end. A slip ring is disposed in the opening at the first end, and a second electrical connector extends from a power source connector into the opening at the second end to form a conductive connection with the slip ring. A first lift unit is coupled to the turning plate, the first lift unit comprising a first actuator and a first lift unit power source adapted to power the first actuator. The first lift unit power source is conductively connected to the slip ring so as to receive power from the first electrical conductor.

According to another embodiment, an overhead lift unit apparatus comprises a first rail comprising a first electrical conductor extending therethrough, and the first electrical conductor is connected to a power source. The overhead lift unit apparatus also comprises a second rail comprising a second electrical conductor extending therethrough, the second electrical conductor connected to the power source. A first carriage is coupled to the first rail, and the first carriage is conductively connected to the first electrical conductor. A second carriage is coupled to the second rail, and the second carriage is conductively connected to the second electrical conductor. A first power source connector is connected to the first carriage by a first carriage connector. A second power source connector is connected to the second carriage by a second carriage connector. A carrier plate coupled to the first and second carriages, and a turning plate is rotatably coupled to the carrier plate via a hub having an axis of rotation, the hub comprising an axle extending through both the turning plate and the carrier plate, the axle comprising an opening extending therethrough. A slip ring disposed in the opening, and an electrical connector couples the first and second power source connectors to the slip ring, the electrical connector extending from the slip ring through the opening to connect to the first and second power source connectors. A first lift unit is coupled to the turning plate comprising a first actuator and a first lift unit power source adapted to power the first actuator and a second lift unit is coupled to the turning plate comprising a second actuator and a second lift unit power source adapted to power the second actuator. The first and second lift units are conductively connected to the slip ring so as to receive power from the power source.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Reference will now be made to embodiments of overhead lift unit assemblies including lift units coupled to a holding structure via a rotatable assembly. The rotatable assembly is configured to be attached to a lift unit such that the lift unit is rotatable about an axis of rotation. The rotatable assembly is coupled to a mounting structure attached to the holding structure at an exterior surface of a hub via a bearing assembly. The hub extends through both the mounting structure and the rotatable assembly and comprises an opening in which a rotatable electrical interface is disposed. A first electrical connector extends from a stationary portion of the rotatable electrical interface through the opening to a location external to the mounting structure such that the stationary portion of the rotatable electrical interface can be conductively connected to a power source connector disposed at the location. The power source connector may be conductively connected to an external power source for providing power to the lift unit. A rotating portion of the rotatable electrical interface may be coupled to the rotatable assembly such that the rotating portion rotates in conjunction with the rotating assembly about the axis of rotation. A second electrical connector extends from the rotating portion of the rotatable electrical interface and the second electrical connector is conductively connected to the lift unit such that power from the power source may be provided to the lift unit via the rotatable electrical interface such that neither the first or second electrical connectors are twisted as the rotatable assembly is rotated with respect to the mounting structure.

Various embodiments of the overhead lift unit assemblies will be described herein with specific reference to the appended drawings.

Figure 1:
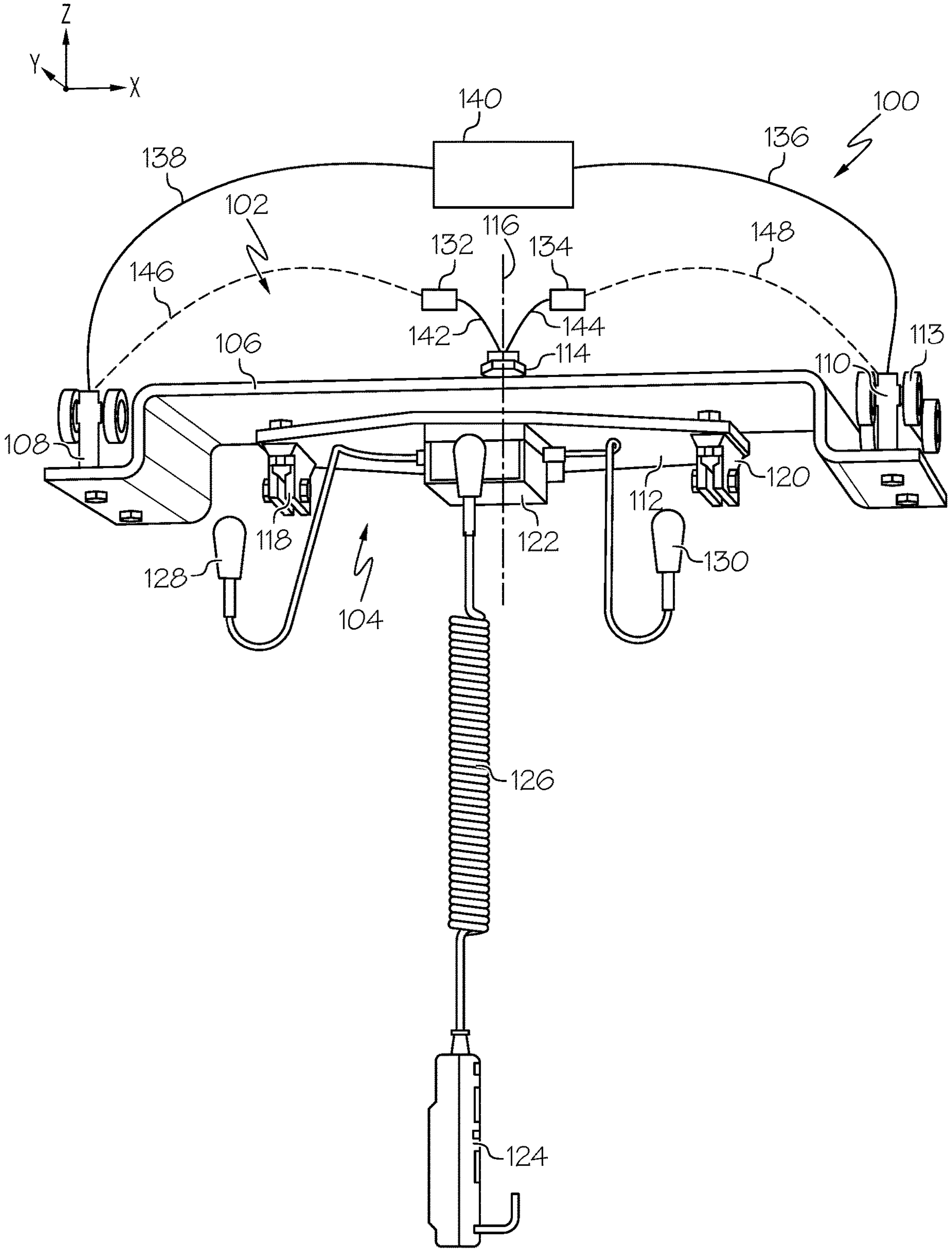
FIG. 1 depicts a perspective view of a lift unit assembly, according to one or more embodiments described herein.
Figure 2:
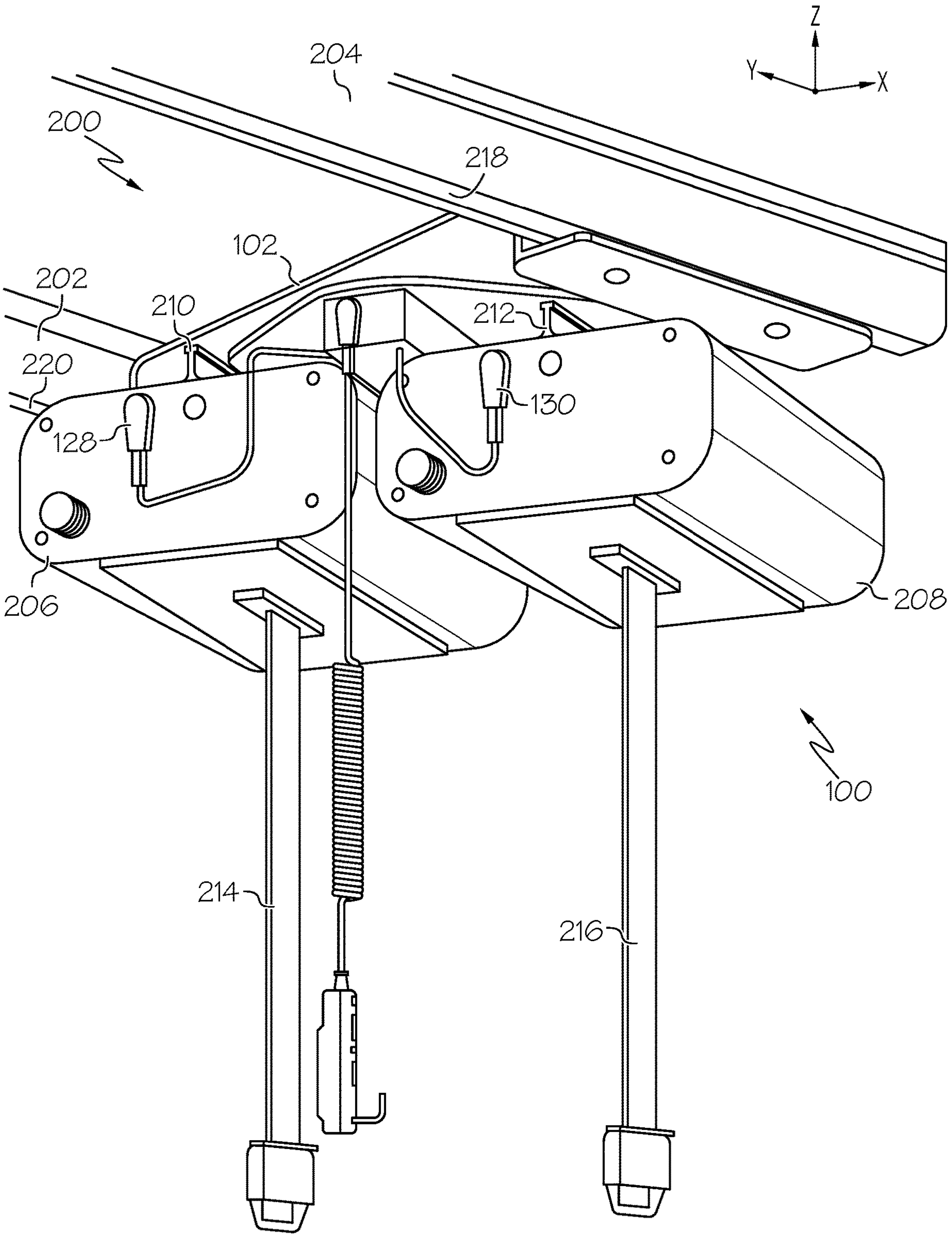
FIG. 2 depicts a perspective view of the lift unit assembly shown in FIG. 1 having two lift units coupled thereto, the lift unit assembly being attached to a holding structure, according to one or more embodiments described herein.

Referring now to FIGS. 1 and 2, a lift unit assembly 100 is depicted. The lift unit assembly 100 is adapted to support at least one lift unit (e.g., the first lift unit 206 and/or the second lift unit 208 shown in FIG. 2). The lift unit assembly 100 comprises a mounting structure 102 and a rotatable assembly 104. The mounting structure 102 comprises a carrier plate 106 configured to be attached to a holding structure 200 (depicted in FIG. 2) for the lift unit assembly 100. The mounting structure 102 further comprises a first carriage 108 disposed on a first end of the carrier plate 106 and a second carriage 110 disposed on a second end of the carrier plate 106 for attaching the mounting structure 102 to the holding structure 200. While the mounting structure 102 is depicted as comprising the carrier plate 106 and carriages 108 and 110, it should be appreciated that alternative embodiments are contemplated and possible. For example, in embodiments, the carrier plate 106 may have only a single carriage attached thereto. Additionally, in embodiments, the mounting structure 102 may not include the carrier plate 106 and may comprise an alternative structure such as a portion of a stand or other assembly adapted to hold a lift unit.

The lift unit assembly 100 is depicted as including a power source 140. In embodiments, the power source 140 is configured to provide current to the power source connectors 132 and 134 via power source conductors 136 and 138 to power or charge lift units attached to the lift unit assembly 100. The current provided via power source conductors 136 and 138 may have any amperage, but may be relatively low (e.g., approximately 500 mA) in certain embodiments. In some embodiments, the power source 140 comprises a battery. Any suitable power source 140 may be used consistent with the present disclosure.

In embodiments, power source conductors 136 and 138 extend between the power source 140 to power source connectors 132 and 134 disposed on a first side (e.g., above the mounting structure in the +Z direction of the coordinate axes depicted in the figures) the mounting structure 102. Power source conductors 136 and 138 may take various forms depending on the implementation. In the depicted example, the power source conductors 136 and 138 extend from the power source 140 to the carriages 108 and 110. As described herein, in such embodiments, the power source conductors 136 and 138 may be incorporated into rails (e.g., the first rail 202 and the second rail 204 depicted in FIG. 2) of the holding structure 200 and a conductive connection may be established between the power source conductors 136 and 138 and the carriages 108 and 110 (e.g., via the conductive rollers 113 described herein). Carriage connectors 146 and 148 may extend between the carriages 108 and 110 and the power source connectors 132 and 134 to provide a conductive path between the power source 140 and the power source connectors 132 and 134 via the power source conductors 136 and 138. In certain embodiments, rather than extending from the power source 140 to the carriages 108 and 110, the power source conductors 136 and 138 may extend directly between the power source 140 and the power source connectors 132 and 134. In such embodiments, the power source conductors 136 and 138 may comprise cables extending from an electrical unit (e.g., an outlet, a power adapter, a lift unit charging station, etc.) to the power source connectors 132 and 134.

The lift unit assembly 100 further comprises a rotatable assembly 104 coupled to the mounting structure 102 via a hub 114. The rotatable assembly 104 is rotatable with respect to the mounting structure 102 about an axis of rotation 116 to provide flexibility in positioning lift units coupled to the rotatable assembly 104. In embodiments, it may be beneficial for the power source conductors 136 and 138 (and any additional electrical connectors attached thereto) to be removed from the rotatable assembly 104 such that the power source conductors 136 and 138 are not twisted or stretched with rotation of the rotatable assembly 104. As such, in the example shown, the power source connectors 132 and 134 are exposed in a region above the mounting structure 102 such that the power source conductors 136 and 138 are removed from the rotatable assembly 104 and any lift units coupled to the rotating plate 112.

As shown in FIG. 2, in embodiments, the holding structure 200 comprises a first rail 202 and a second rail 204 attached to a mounting surface (e.g., a ceiling of a room containing the lift unit assembly 100). The first and second rails 202 and 204 may be stationary (e.g., fixedly attached to the mounting surface) or movable (e.g., the rails 202 and 204 may be slidably disposed in a stationary rail system) depending on the implementation. The first rail 202 may be connected to the mounting structure 102 via the first carriage 108 while the second rail 204 may be connected to the mounting structure 102 via the second carriage 110. For example, in embodiments, each of the rails 202 and 204 may include carriage support channels 218 and 220 into which the carriages 108 and 110 are respectively inserted.

A first lift unit 206 and a second lift unit 208 are attached to the rotatable assembly 104. In embodiments, the first rail 202 and the second rail 204 include electrical conductors (e.g., the power source conductors 136 and 138 depicted in FIG. 1) conductively connected to the power source 140 to, for example, provide charging to lift unit power sources associated with the first lift unit 206 and the second lift unit 208. For example, in such embodiments, the structure of the first and second rails 202 and first and second carriages 108 and 110 may take the form described in U.S. Pat. No. 8,978,905, hereby incorporated by reference in its entirety. In such embodiments, the carriages 108 and 110 may include conductive rollers 113 in contact with the electrical conductors in the first rail 202 and the second rail 204. In such embodiments, carriage connectors 146 and 148 may extend between the carriages 108 and 110 (e.g., from contacts extending from the conductive rollers 113) and the power source connectors 132 and 134 to provide a conductive path between the power source 140 and the lift units 206 and 208. In embodiments, the first rail 202 and/or the second rail 204 do not include such electrical conductors associated with in-rail charging and the lift unit assembly 100 may include a power source cable (e.g., the power source conductors 136 and 138 may be combined into a single power source cable) extending from the power source 140 to a region above the mounting structure 102.

The rotatable assembly 104 includes a rotating plate 112. The rotating plate 112 is rotatably attached to the mounting structure 102 via the hub 114 such that the rotating plate 112 can be rotated about an axis of rotation 116 with respect to the mounting structure 102. In the embodiments described herein, the axis of rotation 116 is generally parallel with the Z-axis of the coordinate axes depicted in the drawings which generally corresponds to the +/− vertical directions. For example, in embodiments, the rotating plate 112 can be rotated by 360 degrees about the axis of rotation 116 by application of a manual force to the rotating plate 112 (or a lift unit attached to the rotating plate 112 or a subject suspended from the lift unit). As described herein, the hub 114 may comprise a rotatable electrical interface disposed in an opening of the hub 114 such that electrical connectors 142 and 144 may extend from the power source connectors 132 and 134 to the rotatable electrical interface to create an electrical path for power from the power source 140 through the hub 114. The hub 114 prevents the electrical connectors 142 and 144 from twisting as the rotatable assembly 104 turns about the axis of rotation 116.

The rotating plate 112 has lift unit attachment devices 118 and 120 disposed at ends thereof. The lift unit attachment devices 118 and 120 are generally configured to be coupled to complementary structures of lift units such that the rotatable assembly 104 is configured to attach at least one lift unit to the mounting structure 102 via the rotating plate 112. In embodiments, lift unit attachment devices 118 and 120 are mounting brackets including cavities configured to receive mounting rails associated with lift units. In other embodiments, the lift unit attachment devices 118 and 120 may include a clevis-pin connection which mates with a complimentary connection of a lift unit. It should be appreciated that, while a rotating plate 112 is depicted in the shown example as a component of the rotatable assembly 104 that couples the lift units to the mounting structure 102, alternative structures are contemplated and possible. For example, in embodiments, the rotatable assembly 104 may include a rotatable rod or bar having an associated lift unit attachment device.

As shown in FIG. 2, a first lift unit 206 is attached to the rotatable assembly 104 via the lift unit attachment device 118 and a second lift unit 208 is attached to the rotatable assembly 104 via the lift unit attachment device 120. As shown, a first mounting rail 210 is attached to the first lift unit 208 and a second mounting rail 212 is attached to the second lift unit 208. The first and second mounting rails 210 and 212 may be inserted into the lift unit attachment devices 118 and 120 and secured therein via fasteners such that the first and second lift units 206 and 208 are fixed relative to the rotating plate 112. As such, by rotating the rotating plate 112, the first and second lift units 206 and 208 rotate in unison about the axis of rotation 116. This facilitates manipulation of subjects (e.g., a sling bar, patient, etc.) attached to the lift units 206 and 208. For example, the rotation of the first and second lift units 206 and 208 may facilitate transfer of a patient to or from the lift unit assembly 100 without having to reposition items (e.g., furniture) in the vicinity of the patient.

As shown in FIG. 1, the rotatable assembly 104 further comprises a connection box 122 attached to the rotating plate 112. In embodiments, the connection box 122 is offset from the hub 114 and the axis of rotation 116. As shown, a controller 124 is communicably coupled to the connection box 122 via a coiled connector 126. It should be appreciated that any form of connection, either wired or wireless, may be used to connect the controller 124 to any of the components (e.g., directly to the lift units 206 and 208) described herein consistent with the present disclosure. The controller 124 may include a user interface configured to receive inputs from a user and be configured to generate control signals for the lift units 206 and 208 based on the received inputs. The control signals may be provided via the coiled connector 126 to the connection box 122. The connection box 122 generally houses a plurality of electrical connections between various components described herein. As shown, a first electrical contact 128 is coupled to the first lift unit 206 (e.g., the first electrical contact 128 may include a plug that is inserted into a receptacle in the first lift unit 206) and a second electrical contact 130 is coupled to the second lift unit 208 via wired connections extending between the lift units 206 and 208 and the connection box 122. In embodiments, control signals generated via the controller 124 are provided to the lift units 206 and 208 responsive to user inputs via the electrical contacts 128 and 130. Such control signals may be provided to actuators (e.g., motors) associated with the lift units 206 and 208 such that lifting straps 214 and 216 are raised or lowered independently from one another or in unison. The operation of lift units 206 and 208 in unison facilitates the lift unit assembly 100 being capable of lifting a load (e.g., up to 500 kg) that is greater than any of the lift units 206 and 208 are capable of lifting independently.

Figure 3:
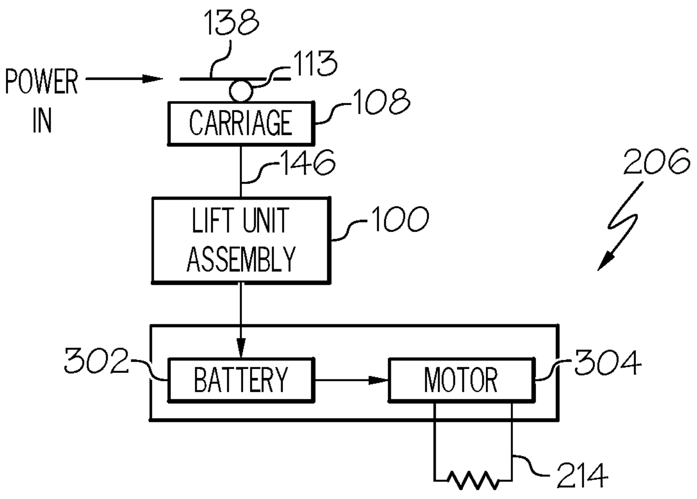
FIG. 3 schematically depicts the electrical interconnectivity of components of a lift unit, according to one or more embodiments described herein.

Referring to FIG. 3, in embodiments, the lift unit 206 includes an actuator, shown as a motor 304, that facilitates paying-out or taking-up the lifting strap 214 from the lift unit 206, thereby raising or lowering a subject (e.g., a patient) attached to the lifting strap 214. In embodiments, the lift unit 206 further includes a lift unit power source, shown as a battery 302. The battery 302 may be housed in the lift unit 206 and electrically coupled to the motor 304 thereby providing power to the motor 304.

In the example shown in FIG. 3, the power source conductor 138 is disposed or incorporated in the rail 202. The conductive roller 113 of the carriage 108 contacts the power source conductor 138 to establish a conduction path through the carriage 108. The carriage connector 146 extends between the conductive roller 113 and additional components of the lift unit assembly 100 (e.g., to the power source connector 132, and through the hub 114 to a rotatable electrical interface disposed in the hub 114). The lift unit assembly 100 (e.g., via a rotatable portion of the rotatable electrical interface disposed in the hub) is electrically coupled to battery 302 (e.g., via the contact 128). As such, FIG. 3 depicts an exemplary conductive path extending continuously between the power source 140 and battery 302 such that the lift unit 206 may be charged using power from the power source 140 at any point where an electrical connection is maintained between the carriage 108 and the power source conductor 138 via the conductive roller 113. It should be appreciated that the carriage 108 and power source conductor 138 may be conductively connected to one another via alternative means. In embodiments, the second lift unit 208 is connected to the power source 140 through a similar set of components (e.g., via the power source conductor 136 extending through the second rail 204 and the carriage 110).

It should be appreciated that the lift unit assembly 100 may take alternative forms depending on the implementation. For example, referring to FIGS. 4-5, perspective views of a lift unit assembly 400 are shown. Lift unit assembly 400 may include similar components to the lift unit assembly 100 described herein with respect to FIGS. 1-2. Accordingly, like reference numerals are used where appropriate to indicate the incorporation of like components. As shown, lift unit assembly 400 differs from the lift unit assembly 100 in that lift units are not attached directly to the rotating plate 112. Instead, in the lift unit assembly 400, lift unit attachment devices 408 and 410 are attached to a carrier rail 406. The carrier rail 406 is attached to the rotating plate 112 via rail attachment brackets 402 and 404 that replace the lift unit attachment devices 118 and 120 described with respect to FIGS. 1-2.

Figure 5:
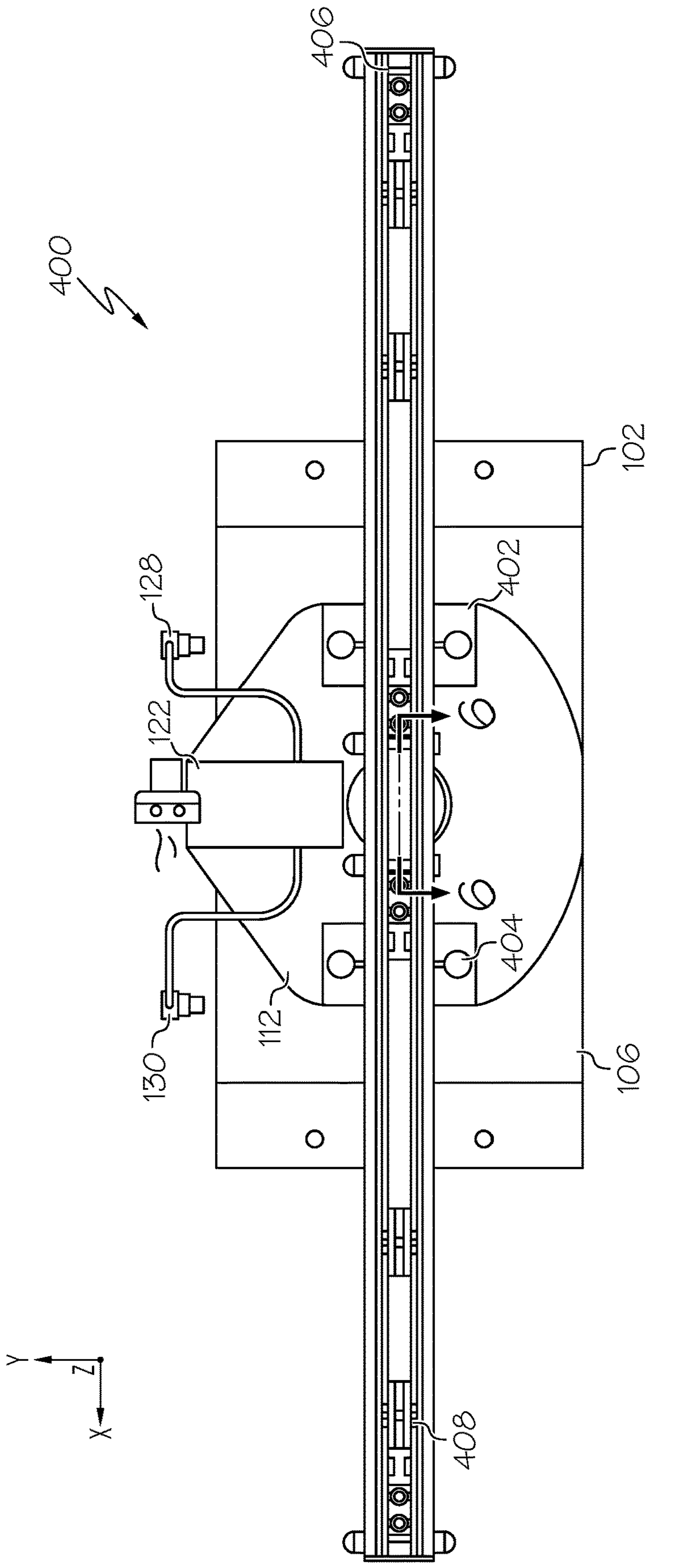
FIG. 5 depicts another perspective view of the lift unit assembly shown in FIG. 4, according to one or more embodiments described herein.

As shown in FIG. 5, the carrier rail 406 is centered with respect to the mounting structure 102. The lift unit attachment devices 408 and 410 are adjustable within a channel of the carrier rail 406 in some embodiments. In the shown configuration, a distance between the lift unit attachment devices 408 and 410 is greater than a width of the rotating plate 112. As such, the addition of the carrier rail 406 facilitates lift units being attached to the rotating plate 112 and being further apart than in the lift unit assembly 100. In embodiments, such a greater distance between lift units may facilitate using the lift unit assembly 400 to lift stretchers or other relatively wide items.

Figure 4:
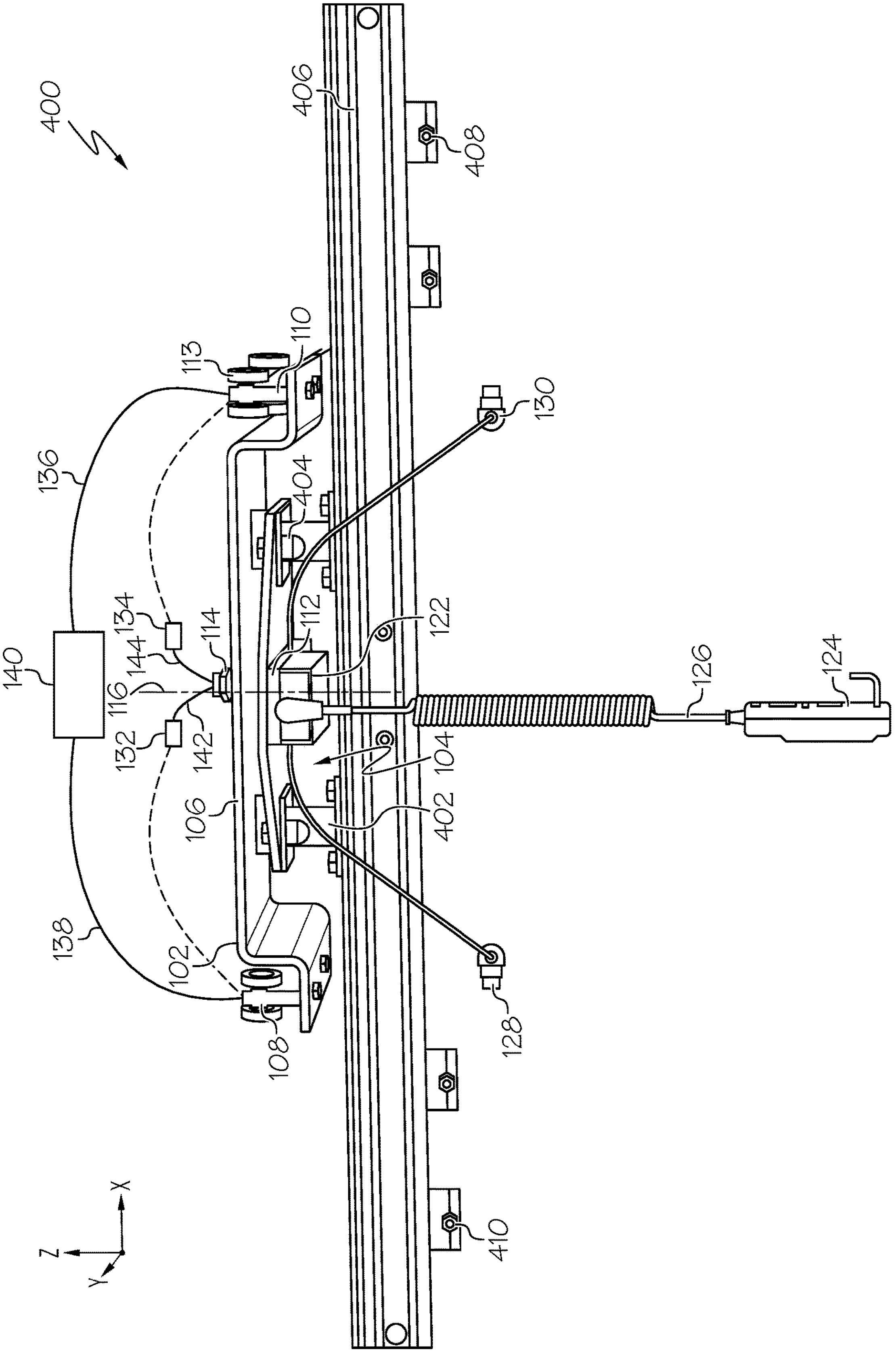
FIG. 4 depicts a perspective view of a lift unit assembly, according to one or more embodiments described herein.

Irrespective of the particular structure of the rotatable assembly 104 (e.g., whether the rotatable assembly 104 comprises the structure described with respect to FIGS. 1-2, the structure described with respect to FIGS. 3-4, or any alternative structure is used) rotation of the rotatable assembly 104 with respect to the axis of rotation 116 may create issues for connecting the power source 140 to the lift units attached to the rotatable assembly 104 and that rotate in conjunction with the rotatable assembly 104 (e.g., the first lift unit 206 and the second lift unit 208 described with respect to FIG. 2). This is especially the case if one wishes to maintain an electrical connection between the lift units and the power source 140 during the rotation of the rotatable assembly 104. In such a case, if the lift units were directly connected to the power source 140, the connectors would twist in conjunction with the rotation of the rotatable assembly 104, which would lead to electrical connection issues. Accordingly, the hub 114 incorporates a rotatable electrical interface to provide a stationary connection point for power source conductors 136 and 138 to be attached within the hub 114. The rotatable electrical interface also provides a rotating connection point for connecting electrical connectors (e.g., from the contacts 128 and 130) extending from elements attached to the rotating plate 112. As such, a conductive path is established that extends through the lift unit assembly while still preventing rotation of electrical connectors.

Figure 6:
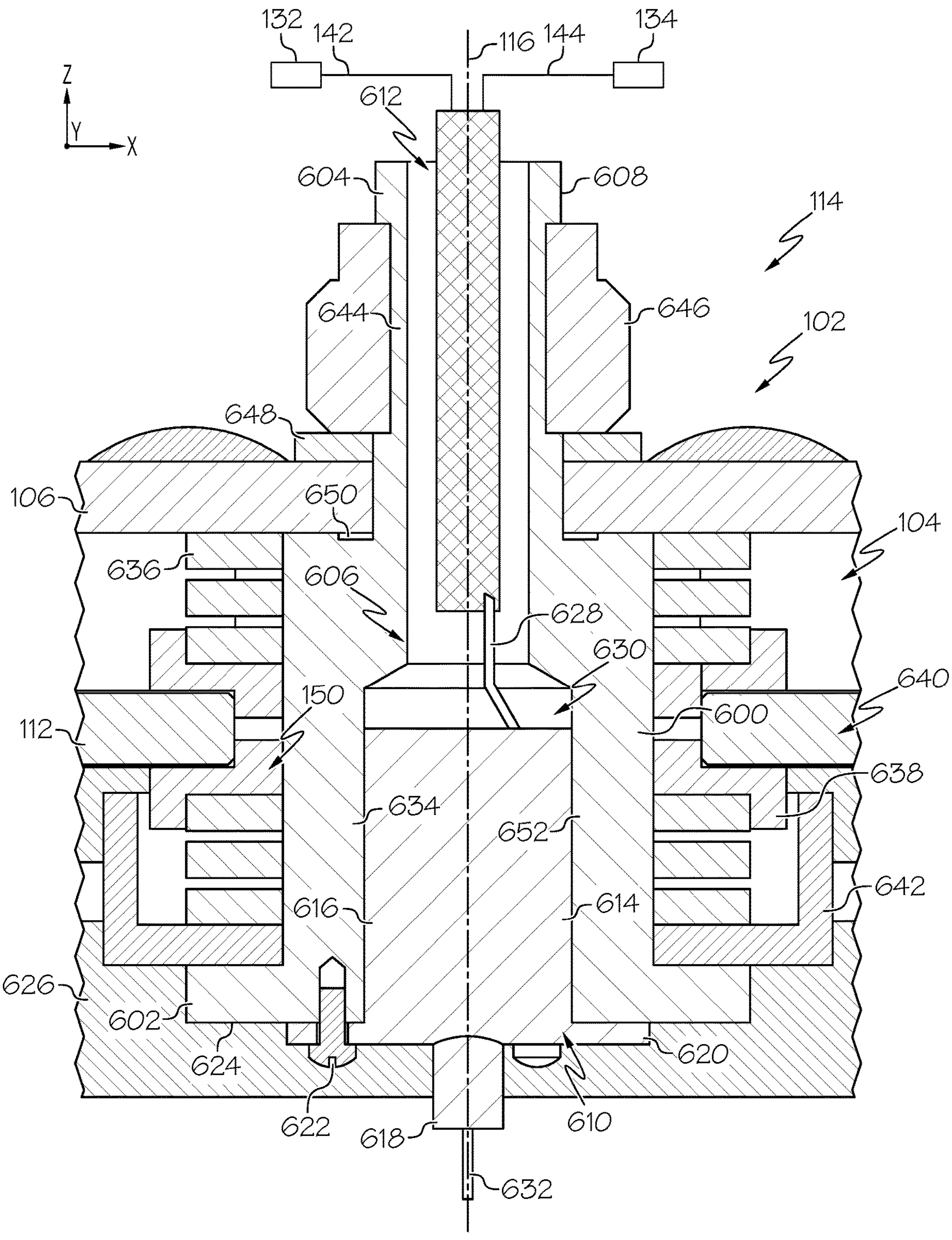
FIG. 6 depicts a cross-sectional view of a portion of a rotatable assembly of a lift unit assembly, according to one or more embodiments described herein.

FIG. 6 depicts a cross-sectional view of a portion of the lift unit assembly 400 described herein with respect to FIGS. 4-5. As shown, the cross-sectional view depicts the central hub 114 that may be included in both the lift unit assembly 100 and the lift unit assembly 400 described herein. The central hub 114 comprises an axle 600 extending through both the mounting structure 102 and the rotating plate 112. A first end 602 of the axle 600 extends beneath the rotating plate 112, while a second end 604 of the axle 600 extends above the mounting structure 102. The axle 600 includes an opening 606 that extends through the entirety of the axle 600 between the first end 602 and the second end 604. In embodiments, the electrical connectors 142 and 144 connected to the power source connectors 132 and 134 comprise wiring within a connection cable 608 extending through the opening 606. The connection cable 608 extends through the opening 606 at the second end 604 to connect to the power source connectors 132 and 134 disposed externally to the hub 114. The opening 606 may possess any suitable shape depending on the implementation. In embodiments, the opening 606 is shaped based on components (e.g., the connection cable 608, the rotatable electrical interface 614) disposed therein. For example, in embodiments, the connection cable 608, the rotatable electrical interface 614, and the opening 606 may each possess substantially circular cross-sections.

In embodiments, the first portion 610 and second portion 612 of the opening 606 are sized based on components subsequently disposed therein. As shown, a rotatable electrical interface 614 is disposed in the first portion 610 of the opening 606. The rotatable electrical interface 614 is a rotatable electrical connector (e.g., a slip ring, a rotating electrical connector, an electrical rotary joint) comprising a stationary portion 616 (e.g., a stator) and a rotating portion 618 (e.g., a rotor or a rotatable rod) that is rotatable with respect to the stationary portion 616. In embodiments, the rotatable electrical interface 614 is configured to maintain a conductive connection between the rotating portion 618 and the stationary portion 616 irrespective of the rotational state of the rotating portion 618 (e.g., irrespective of the relative rotational position of the rotating portion 618 or whether the rotating portion 618 is in motion). For example, in embodiments, the rotatable electrical interface 614 includes a contacting element (e.g., a metallic brush, not depicted) extending between the stationary portion 616 and the rotating portion 618 to maintain the conductive connection. In embodiments, the first portion 610 of the opening 606 is sized to substantially correspond to a size of the stationary portion 616 such that the stationary portion 616 fits snugly in the first portion 610 to prevent the collection of dust or other debris within the opening 606.

In embodiments, the stationary portion 616 of the rotatable electrical interface 614 is attached to an external surface 624 of the axle 600 at the first end 602 of the axle 600. As shown, the stationary portion 616 may include a mounting flange 620 extending radially outward from a body of the stationary portion 616 to facilitate attachment of the stationary portion 616 to the external surface 624 of the axle 600. The mounting flange 620 comprises openings for fasteners 622 that fix the stationary portion 616 within the opening 606. In such an arrangement, the fasteners 622 are beneficially arranged substantially parallel to the axis of rotation 116 to facilitate the hub 114 bearing a load of the lift units coupled to the rotating plate 112. In embodiments, the rotating portion 618 of the rotatable electrical interface 614 is attached to the rotating plate 112 via a suitable connector 626 such that the rotating portion 618 rotates in conjunction with the rotating plate 112 when a rotational force is applied to the rotating plate 112.

As described herein, the second portion 612 of the opening 606 comprises a connection cable 608 disposed therein. In embodiments, the connection cable 608 is conductively connected to the stationary portion 616 of the rotatable electrical interface 614 via wiring 628 extending through the connection cable 608. As such, the connection cable 608 establishes an electrical connection between the rotatable electrical interface 614 and the power source via the power source connectors 132 and 134. In embodiments, the second portion 612 of the opening 606 is sized based on a size of the connection cable 608. For example, the second portion 612 may be sized to possess a cross-sectional area that is greater than that of the connection cable 608 by a threshold amount that provides adequate clearance for insertion of the connection cable 608 but maintains an adequate thickness of the axle 600 to maintain a load-bearing capacity of the axle 600.

In the example shown, the first portion 610 of the opening 606 possesses a cross-sectional area that is greater than that of the second portion 612 of the opening 606. Such an arrangement facilitates insertion of the connection cable 608 and the rotatable electrical interface 614 into the axle 600. In embodiments, during assembly of the hub 114, the connection cable 608 is attached to the rotatable electrical interface 614 prior to being inserted into the axle 600. The assembly of the connection cable 608 and the rotatable electrical interface 614 are then inserted into the axle 600 at the first end 602 through the first portion 610 of the opening 606. In embodiments, the angled portion 630 beneficially guides the connection cable 608 through a center of the opening 606 to facilitate a relatively small clearance between the connection cable 608 and the second portion 612 of the opening 606.

As shown, electrical connectors 632 extend from the rotating portion 618 of the rotatable electrical interface 614. In embodiments, the electrical connectors 632 extend to elements attached to the rotating plate 112 (e.g., to the connection box 122 for electrical connection to contacts 128 and 130, directly to lift units 206 and 208 coupled to the rotating plate 112, etc.). Given that the rotating portion 618 rotates in conjunction with the rotating plate 112, the electrical connectors 632 do not twist with rotation of the rotating plate 112. As such, the hub 114, by incorporating an opening for the rotatable electrical interface 614, facilitates an electrical connection between the lift units 206 and 208 and the power source 140 without any of the electrical connectors being twisted with the rotation of the rotating plate 112. Such a connection facilitates reliable electrical connections capable of long-term use.

The rotating plate 112 includes an opening 150 through which the axle 600 extends. The rotating plate 112 is coupled to an external surface 634 of the axle 600 via a bearing assembly 636. In embodiments, the bearing assembly 636 circumferentially surrounds the axle 600 beneath the mounting structure 102. In embodiments, the bearing assembly 636 includes a bearing guide 638 that defines a slot 640 sized to receive the rotating plate 112 at the opening 150 formed in the rotating plate 112. In other words, the bearing assembly 636 may be attached to the rotating plate 112 via the bearing guide 638 such that rollers within the bearing assembly 636 allow for rotation of the rotating plate 112 around the axle 600 about the axis of rotation 116. The bearing assembly 636 may take various forms depending on the implementation. For example, in embodiments, the bearing assembly 636 comprises a thrust bearing. The thrust bearing may comprise rollers in various configurations. For example, in embodiments, the thrust bearing may include tapered rollers disposed on either side of the rotating plate 112. Other configurations of rollers (e.g., cylindrical or spherical rollers) may also be used.

As shown, a bearing cover 642 is disposed between the axle 600 and the bearing guide 638. In embodiments, the bearing cover 642 is attached to the external surface 634 of the axle 600 and covers an entirety of the bearing assembly 636 such that the portion of the bearing assembly 636 disposed beneath the rotating plate 112 is not exposed to dust or other debris that may disrupt the operation of the bearing assembly 636. Some embodiments do not include the bearing cover 642 and the axle 600 may include a portion shaped in a manner that largely corresponds to the bearing cover 642 to protect the bearing assembly 636 (e.g., the bearing cover 642 may be integrated into the axle 600 to minimize parts of the hub 114).

An upper portion 644 of the axle 600 protruding through the mounting structure 102 is secured to the mounting structure 102 via a fastener 646. In embodiments, the upper portion 644 is threaded such that the fastener 646 may be tightened around the upper portion 644 to secure the axle 600 to the mounting structure 102. A washer 648 may be disposed between the fastener 646 and the mounting structure 102 to facilitate the tightening of the fastener 646. In the example shown, the axle 600 includes a stepped portion 650 at a boundary between the upper portion 644 and a lower portion 652 of the axle 600 disposed beneath the mounting structure 102. As shown, the lower portion 652 possesses a greater cross sectional area than the upper portion 344. Given that the first portion 610 of the opening 606, which extends through the lower portion 652, has a greater cross sectional area than the second portion 612 of the opening, the greater cross sectional area of the lower portion 652 facilitates an adequate thickness of the axle 600 throughout to provide structural support for the rotating plate 112 and the elements attached thereto. Moreover, the transition in cross-sectional area between the lower portion 652 and the upper portion 644 creates the stepped portion 650, which provides a resting surface for a portion of the carrier plate 106 disposed directly between the fastener 646 and the axle 600. The stepped portion 650 causes the bearing assembly 636 to be offset from the fastener 646 in a radial direction. This way, the fastener 646 may be tightened as much as needed to provide a secure connection to the mounting structure 102 without disrupting rotation of the bearing assembly 636.

In view of the foregoing description, it will be apparent that rotatably coupling a rotatable lift unit assembly to a mounting structure via a hub including a rotatable electrical interface facilitates providing reliable electrical connections between lift units attached to the rotatable lift unit assembly and a power source located external to the lift unit assembly. By electrically connecting the lift units to a rotating component of the rotatable electrical interface that is secured to the rotatable assembly and connecting the power source to a stationary component of the rotatable electrical interface, twisting and bending of electrical connectors is beneficially avoided to facilitate reliable electrical connections. Such an implementation provides the flexibility of being able to rotate lift units secured to the mounting structure while still providing benefits of electrically connecting the lift units to a non-rotating external power source to, for example, charge lift unit power sources associated with the lift units.

In a first aspect A1, an overhead lift apparatus comprises a mounting structure and a rotatable assembly configured to attach a lift unit to the mounting structure. The rotatable assembly is rotatable with respect to the mounting structure about an axis of rotation. The apparatus also includes a rotatable electrical interface disposed in the rotatable assembly, wherein the rotatable electrical interface comprises a static portion and a rotatable portion attached to the rotatable assembly such that the rotatable portion rotates in conjunction with the rotatable assembly. The apparatus also includes a first electrical connector extending from the static portion to a power source connector. The power source connector is configured to be connected to an external power source for the lift unit. A second electrical connector extends from the rotatable portion such that the rotatable electrical interface is configured to provide power from the power source to an end of the second electrical connector via the first electrical connector.

A second aspect A2 includes the apparatus of A1, further comprising a first lift unit attached to the rotatable assembly, the first lift unit comprising a lift unit power source conductively connected to the second electrical connector such that the first lift unit receives power from the power source via the rotatable electrical interface.

A third aspect A3 includes the apparatus of A2, wherein the mounting structure comprises: a first rail having a first carriage support channel formed in the first rail; a first carriage slidably disposed in the first carriage support channel; and a support structure attached to the first carriage, wherein the rotatable assembly is coupled to the support structure.

A fourth aspect A4 includes the apparatus of A3, wherein power from the power source is provided through a first electrical conductor extending through the first rail, the apparatus further comprising a first carriage connector extending between the first carriage and the power source connector such that the power from the power source is provided from the first rail to the first lift unit via the first carriage and the rotating assembly.

A fifth aspect A5 includes the apparatus of A3, wherein the rotating assembly comprises a rotating plate coupled to the rotatable portion, wherein the first lift unit is attached to the rotating plate on a first side of the rotating plate, the apparatus further comprising a second lift unit attached to a rotating plate on a second side of the rotating plate, wherein the rotatable electrical interface is disposed between the first lift unit and the second lift unit.

A sixth aspect A6 includes the apparatus of A5, wherein the mounting structure comprises: a second rail having a second carriage support channel formed in the second rail, the second rail extending parallel to the first rail; and a second carriage slidably disposed in the second carriage support channel, wherein the first carriage is attached to the support structure at a first end of the support structure and the second carriage is attached to the support structure at a second end of the support structure.

A seventh aspect A7 includes the apparatus of A6, wherein power from the power source is provided through a second electrical conductor extending through the second rail, the apparatus further comprising a second carriage connector extending between the second carriage and the power source connector such that the power from the power source is provided from the second rail to the second lift unit via the second carriage and the rotating assembly.

An eighth aspect A8 includes the apparatus of A1, further comprising: a hub extending through the mounting structure and the rotatable assembly, wherein the rotatable assembly is attached to an exterior surface of the hub via a bearing assembly, the hub comprising an opening that extends from a first end of the hub to a second end of the hub, wherein the rotatable electrical interface is disposed in the opening of the hub, wherein the opening of the hub comprises a first portion having a first cross-sectional area extending from the first end and a second portion having a second cross-sectional area extending from the second end, wherein the second cross-sectional area is less than the first cross sectional area, wherein the rotatable electrical interface is disposed in the first portion.

A ninth aspect A9 includes the apparatus of A8, wherein the first electrical connector extends through second portion of the opening of the hub, wherein the second cross-sectional area is greater than a cross-sectional area of the first electrical connector by less than or equal to a predetermined amount.

A tenth aspect A10 includes the apparatus of A8, wherein the opening of the hub further comprises an angled portion extending between the first portion and the second portion, wherein the angled portion comprises tapered surfaces configured to direct the first electrical connector through the first portion.

An eleventh aspect A11 includes the apparatus of A8, further comprising a fastener securing the second end of the hub to the mounting structure, wherein the hub comprises a step portion supporting the mounting structure, wherein the mounting structure comprises a supported portion disposed directly between the step portion and the fastener, wherein the bearing assembly is offset from the step portion.

A twelfth aspect A12 includes the apparatus of A1, wherein the rotatable electrical interface comprises a slip ring assembly.

In a thirteen aspect A13 includes an overhead lift apparatus comprises a first rail having a first carriage support channel formed in the first rail, wherein the first rail includes a first electrical conductor disposed in the first carriage support channel; a first carriage slidably disposed in the first carriage support channel, a portion of the first carriage is conductively connected to the first electrical conductor; a first electrical connector extending from the portion of the first carriage to a power source connector; a carrier plate coupled to the first carriage; a turning plate rotatably coupled to the carrier plate via hub having an axis of rotation. The hub comprises an axle extending through both the turning plate and the carrier plate, the axle comprises a first end extending beneath the turning plate, a second end extending above the carrier plate, and an opening extending from the first end to the second end; and a slip ring disposed in the opening at the first end, a second electrical connector extends from the power source connector into the opening at the second end to form a conductive connection with the slip ring. The overhead lift apparatus further comprises a first lift unit coupled to the turning plate, the first lift unit comprising a first actuator and a first lift unit power source adapted to power the first actuator, wherein the first lift unit power source is conductively connected to the slip ring so as to receive power from the first electrical connector.

A fourteenth aspect A14 includes the apparatus of A13, wherein the turning plate is coupled to the axle via a bearing assembly circumferentially surrounding the axle.

A fifteenth aspect A15 includes the apparatus of A13, wherein the opening comprises a first portion extending from the first end of the axle and a second portion extending between the first portion and the second end of the axle, wherein the slip ring is disposed in the first portion, wherein a cross sectional area of the opening is greater in the first portion than in the second portion.

A sixteenth aspect A16 includes the apparatus of A15, wherein the opening comprises an angled portion disposed between the first portion and the second portion, wherein the cross-sectional area of the opening varies with distance from the first end in the angled portion.

A seventeenth aspect A17 includes the apparatus of A15, wherein the slip ring comprises a flange in contact with an exterior surface of the axle at the first end, wherein fasteners extend through the flange into the axle such that the slip ring is attached to the axle at the exterior surface.

A eighteenth aspect A18 includes the apparatus of A13, wherein the carrier plate is coupled to the first carriage at a first end of the carrier plate, wherein the hub is coupled to the carrier plate in a central portion of the carrier plate offset from the first end of the carrier plate, the apparatus further comprising: a second rail having a second carriage support channel formed in the second rail; and a second carriage slidably disposed in the second carriage support channel, wherein the rotatable support assembly is coupled to the carrier plate between the first and second ends of the carrier plate.

A nineteenth aspect A19 includes the apparatus of A18, wherein the first lift unit is disposed on a first side of the axis of rotation, the apparatus further comprising a second lift unit coupled to the turning plate comprising a second actuator and a second lift unit power source, wherein the second lift unit is disposed on a second side of the axis of rotation, wherein the second lift unit power source is conductively connected to the slip ring so as to receive power from the power source.

In a twentieth aspect A20, an overhead lift unit apparatus comprises: a first rail comprising a first electrical conductor extending therethrough, the first electrical conductor connected to a power source; a second rail comprising a second electrical conductor extending therethrough, the second electrical conductor connected to the power source; a first carriage coupled to the first rail, wherein the first carriage is conductively connected to the first electrical conductor; a second carriage coupled to the second rail, wherein the second carriage is conductively connected to the second electrical conductor; a first power source connector connected to the first carriage by a first carriage connector; a second power source connector connected to the second carriage by a second carriage connector; a carrier plate coupled to the first and second carriages; a turning plate rotatably coupled to the carrier plate via a hub having an axis of rotation, the hub comprising an axle extending through both the turning plate and the carrier plate, the axle comprising an opening extending therethrough; a slip ring disposed in the opening; an electrical connector coupling the first and second power source connectors to the slip ring, wherein the electrical connector extends from the slip ring through the opening to connect to the first and second power source connectors; a first lift unit coupled to the turning plate comprising a first actuator and a first lift unit power source adapted to power the first actuator; and a second lift unit coupled to the turning plate comprising a second actuator and a second lift unit power source adapted to power the second actuator, wherein the first and second lift units are conductively connected to the slip ring so as to receive power from the power source. A twenty first aspect A21 includes the apparatus of A20, wherein the turning plate is rotatable by 360 degrees about the axis of rotation.

A twenty second aspect A22 includes the apparatus of A20, wherein the axle is adapted to bear a working load of the first and second lift units.

A twenty third aspect A23 includes the apparatus of A20, further comprising a mounting rail attached to the turning plate via mounting brackets attached to first and second ends of the turning plate, respectively, wherein the mounting rail extends perpendicular to the axis of rotation, wherein the first and second lift units are attached to the mounting rail via third and fourth carriages attached to the mounting rail, wherein a distance between the first and second lift units is greater than a width of the turning plate.

A twenty fourth aspect A24 includes the apparatus of A20, further comprising: a connection box attached to the turning plate, wherein the connection box is offset from the axis of rotation, wherein the connection box is conductively connected to the slip ring; a first electrical contact extending from the connection box to the first lift unit, wherein the first lift unit power source is conductively connected to the slip ring via the first electrical contact; and a second electrical contact extending from the connection box to the second lift unit, wherein the second lift unit power source is conductively connected to the slip ring via the second electrical contact.

A twenty fifth aspect A25 includes the apparatus of A24, further comprising a controller communicably coupled to the connection box, wherein the controller is configured to generate control signals for the first and second life units that are provided to the first and second lift units via the first and second electrical contacts.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. An overhead lift apparatus comprising:
a mounting structure;
a rotatable assembly configured to attach a lift unit to the mounting structure, wherein the rotatable assembly is rotatable with respect to the mounting structure about an axis of rotation;
a rotatable electrical interface disposed in the rotatable assembly, wherein the rotatable electrical interface comprises a static portion and a rotatable portion attached to the rotatable assembly such that the rotatable portion rotates in conjunction with the rotatable assembly;
a first electrical connector extending from the static portion to a power source connector;
a second electrical connector extending from the rotatable portion;
a first lift unit attached to the rotatable assembly, the first lift unit comprising a lift unit power source conductively connected to the second electrical connector such that the first lift unit receives power from the power source via the rotatable electrical interface; and
a second lift unit attached to the rotatable assembly,
wherein the mounting structure comprises:
a first rail having a first carriage support channel formed in the first rail,
a second rail having a second carriage support channel formed in the second rail,
the second rail extending parallel to the first rail,
a first carriage slidably disposed in the first carriage support channel, and
a second carriage slidably disposed in the second carriage support channel; and
wherein power from the power source is provided through a second electrical conductor extending through the second rail, the apparatus further comprising a second carriage connector extending between the second carriage and the power source connector such that the power from the power source is provided from the second rail to the second lift unit via the second carriage and the rotatable assembly.

2. The overhead lift apparatus of claim 1, wherein the mounting structure further comprises:
a support structure attached to the first carriage and to the second carriage, wherein the rotatable assembly is coupled to the support structure.

3. The overhead lift apparatus of claim 2, wherein power from the power source is provided through a first electrical conductor extending through the first rail, the apparatus further comprising a first carriage connector extending between the first carriage and the power source connector such that the power from the power source is provided from the first rail to the first lift unit via the first carriage and the rotatable assembly.

4. The overhead lift apparatus of claim 2, wherein the rotatable assembly comprises a rotating plate coupled to the rotatable portion, wherein the first lift unit is attached to the rotating plate on a first side of the rotating plate, and the second lift unit attached to the rotating plate on a second side of the rotating plate, wherein the rotatable electrical interface is disposed between the first lift unit and the second lift unit.

5. The overhead lift apparatus of claim 4, wherein
the first carriage is attached to the support structure at a first end of the support structure and the second carriage is attached to the support structure at a second end of the support structure.

6. The overhead lift apparatus of claim 1, further comprising:
a hub extending through the mounting structure and the rotatable assembly, wherein the rotatable assembly is attached to an exterior surface of the hub via a bearing assembly, the hub comprising an opening that extends from a first end of the hub to a second end of the hub, wherein the rotatable electrical interface is disposed in the opening of the hub,
wherein the opening of the hub comprises a first portion having a first cross-sectional area extending from the first end and a second portion having a second cross-sectional area extending from the second end, wherein the second cross-sectional area is less than the first cross sectional area, wherein the rotatable electrical interface is disposed in the first portion.

7. The overhead lift apparatus of claim 6, wherein the first electrical connector extends through second portion of the opening of the hub, wherein the second cross-sectional area is greater than a cross-sectional area of the first electrical connector by less than or equal to a predetermined amount.

8. The overhead lift apparatus of claim 6, wherein the opening of the hub further comprises an angled portion extending between the first portion and the second portion, wherein the angled portion comprises tapered surfaces configured to direct the first electrical connector through the first portion.

9. The overhead lift apparatus of claim 6, further comprising a fastener securing the second end of the hub to the mounting structure, wherein the hub comprises a step portion supporting the mounting structure, wherein the mounting structure comprises a supported portion disposed directly between the step portion and the fastener, wherein the bearing assembly is offset from the step portion.

10. An overhead lift apparatus comprising:

a first rail having a first carriage support channel formed in the first rail;

a first carriage slidably disposed in the first carriage support channel;

a carrier plate coupled to the first carriage; and a turning plate rotatably coupled to the carrier plate via hub having an axis of rotation, the hub comprising:

an axle extending through both the turning plate and the carrier plate, wherein the axle comprises a first end extending beneath the turning plate, a second end extending above the carrier plate, and an opening extending from the first end to the second end; and a slip ring disposed in the opening at the first end.

11. The overhead lift apparatus of claim 10, wherein the turning plate is coupled to the axle via a bearing assembly circumferentially surrounding the axle.

12. The overhead lift apparatus of claim 10, wherein the opening comprises a first portion extending from the first end of the axle and a second portion extending between the first portion and the second end of the axle, wherein the slip ring is disposed in the first portion, wherein a cross sectional area of the opening is greater in the first portion than in the second portion.

13. The overhead lift apparatus of claim 12, wherein the opening comprises an angled portion disposed between the first portion and the second portion, wherein the cross-sectional area of the opening varies with distance from the first end in the angled portion.

14. The overhead lift apparatus of claim 12, wherein the slip ring comprises a flange in contact with an exterior surface of the axle at the first end, wherein fasteners extend through the flange into the axle such that the slip ring is attached to the axle at the exterior surface.

15. The overhead lift apparatus of claim 10, wherein the carrier plate is coupled to the first carriage at a first end of the carrier plate, wherein the hub is coupled to the carrier plate in a central portion of the carrier plate offset from the first end of the carrier plate, the apparatus further comprising:

a second rail having a second carriage support channel formed in the second rail; and a second carriage slidably disposed in the second carriage support channel, wherein a rotatable support assembly is coupled to the carrier plate between the first and second ends of the carrier plate.

16. The overhead lift apparatus of claim 10, further comprising:

a first lift unit disposed on a first side of the axis of rotation; and a second lift unit coupled to the turning plate, wherein the second lift unit is disposed on a second side of the axis of rotation; and wherein a power source of the second lift unit is conductively connected to the slip ring.

17. An overhead lift unit apparatus comprising:

a first rail;

a second rail;

a first carriage coupled to the first rail;

a second carriage coupled to the second rail;

a carrier plate coupled to the first and second carriages;

a turning plate rotatably coupled to the carrier plate via a hub having an axis of rotation, the hub comprising an axle extending through both the turning plate and the carrier plate, the axle comprising a first end extending beneath the turning plate, a second end extending above the carrier plate, and an opening extending from the first end to the second end;

a slip ring disposed in the opening at the first end;

a first lift unit coupled to the turning plate; and a second lift unit coupled to the turning plate, wherein the first and second lift units are conductively connected to the slip ring.

18. The overhead lift unit apparatus of claim 17, wherein:

the turning plate is rotatable by 360 degrees about the axis of rotation, and the axle is adapted to bear a working load of the first and second lift units.

* * * * *